P. J. HEALY.
WATER TUBULAR BOILER FOR LOCOMOTIVES.
APPLICATION FILED AUG. 21, 1913.

1,109,526.

Patented Sept. 1, 1914.

Witnesses
R. S. Trogner
W. H. Wakefield

Inventor
Patrick J. Healy
By Mason Fenwick Lawrence
Attorneys

P. J. HEALY.
WATER TUBULAR BOILER FOR LOCOMOTIVES.
APPLICATION FILED AUG. 21, 1913.

1,109,526.

Patented Sept. 1, 1914
7 SHEETS—SHEET 3.

P. J. HEALY.
WATER TUBULAR BOILER FOR LOCOMOTIVES.
APPLICATION FILED AUG. 21, 1913.

1,109,526.

Patented Sept. 1, 1914.
7 SHEETS—SHEET 5.

P. J. HEALY.
WATER TUBULAR BOILER FOR LOCOMOTIVES.
APPLICATION FILED AUG. 21, 1913.

1,109,526.

Patented Sept. 1, 1914
7 SHEETS—SHEET 6.

FIG. 9.

Witnesses
R. S. Trogner
W. H. Wakefield

Inventor
Patrick J. Healy

By Mason Fenwick & Lawrence
Attorneys

UNITED STATES PATENT OFFICE.

PATRICK J. HEALY, OF SEATTLE, WASHINGTON, ASSIGNOR OF ONE-THIRD TO WILLIAM R. HOUGHTLING, OF SEATTLE, WASHINGTON.

WATER TUBULAR BOILER FOR LOCOMOTIVES.

1,109,526.  Specification of Letters Patent. Patented Sept. 1, 1914.

Application filed August 21, 1913. Serial No. 785,984.

*To all whom it may concern:*

Be it known that I, PATRICK J. HEALY, citizen of the United States, residing at Seattle, in the county of King and State of Washington, have invented certain new and useful Improvements in Water Tubular Boilers for Locomotives; and I do hereby declare the following to be a full, clear, and exact description of the invention, such as will enable others skilled in the art to which it appertains to make and use the same.

Modern steam boilers are generally divided into two classes, namely, fire tube boilers and water tube boilers, and it is usually the practice to provide a body of water which is in connection with the water tubes in the one case and a body of water through which the fire tubes pass in the other case. Both of these forms of boilers have heretofore been used successfully for stationary work, but it has been found that the fire tube boiler, wherein tubes conducting gases of combustion pass through a large body of water, lends itself most readily and practicably to the construction of locomotive boilers. In the case of locomotive boilers there are frequently heavy demands made upon the boiler for a large supply of steam, and the result of the supplying of this demand is that the pressure in the boiler decreases materially, with the result that the water in the boiler, which of course is at a temperature considerably higher than 212° F., will be partly converted into steam at the lower pressure. In order that the water may not flow to a dangerous level and thereby expose the crown sheet, a large body of water is usually carried in the barrel of the ordinary locomotive boiler, and it has been thought that inasmuch as most water tubular boilers of the ordinary construction have a small capacity, their use in locomotives would result in the using up of a large proportion of the water when the pressure was reduced to any extent.

The advantages accruing from the use of a water tube boiler for locomotives are numerous, among them being the obviating of the crown sheet which is usually the cause of explosions when the water gets low, the obviating of the use of stays, the cheaper construction resulting from the use of tubes, the greater heating surface exposed, the ease of construction and cleaning of the boilers, and the ease of repairing, together with other points of advantage.

In order that the boiler which is applied to locomotives may be tubular and at the same time free from the disadvantages which have been enumerated incident upon the use of tubular boilers for locomotives, it is necessary to provide for a large body of water contained in tubes and to provide means for inter-communicating the tubes and connecting the same to the dome, steam chest and other locomotive accessories, as may be desired by the engineer.

The present invention has to do with the construction of a tubular locomotive boiler, wherein the shell of the boiler is made up of a number of inter-connected tubes which are preferably bent ring shaped, so that the two sides and bottom of each ring are filled with water, while the bridge or upper part of each ring may be taken as a steam reservoir.

I am aware that under foreign practice of locomotive construction water tubes have been used just over the crown sheet, and that in domestic practice water tubes have been placed just under the crown sheet, where the flames from the fire box may strike the same, but the purpose of these pipes, and in fact the only function which they perform, is to set up circulation in order that the production of steam may be promoted more rapidly.

The particular assembly of any one design of locomotive boiler may vary from other designs and still accord with the spirit of the present invention, and it is to be understood that the showing given in the drawings and accompanying description relates to one of several constructions which may be used.

In order that the invention may be understood reference is to be had to the accompanying drawings, wherein.

Like reference characters designate corresponding parts throughout the views.

Figure 4:
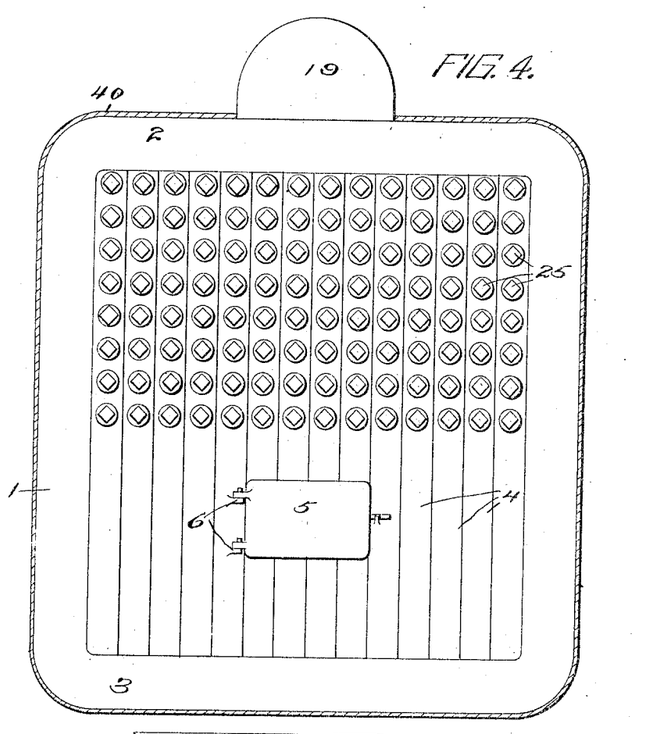
Fig. 4 is an end view of the rear of the boiler looking from the cab.
Figure 5:
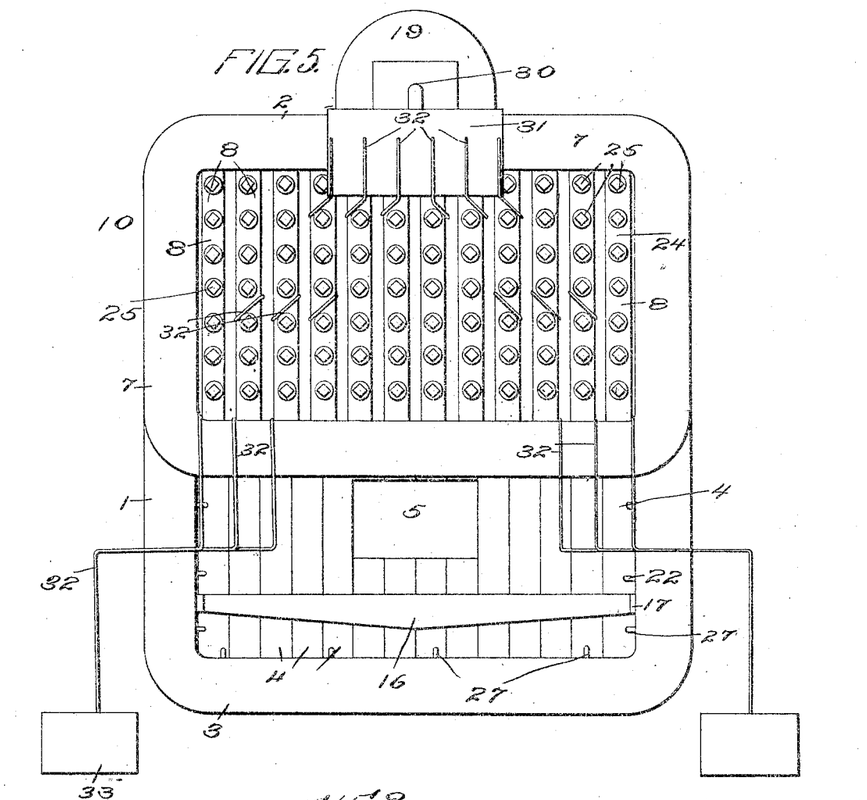
Fig. 5 shows the fore end of the locomotive looking from the smoke box.
Figure 6:
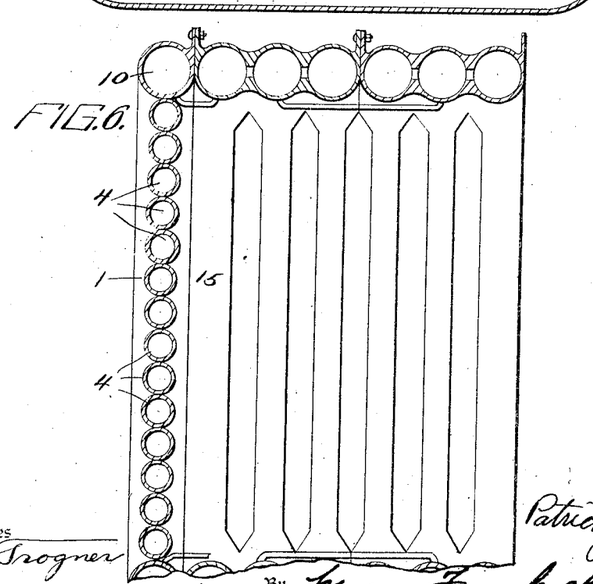
Fig. 6 is a sectional view looking down upon the fire bed, showing part of the grate removed and disclosing means for dropping ashes through the bottom of the boiler.
Figure 7:
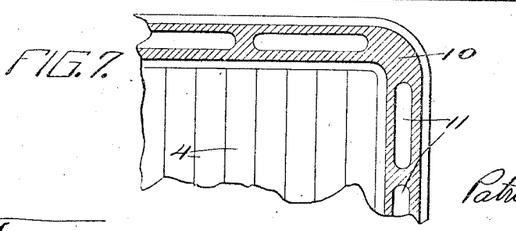
Fig. 7 is a partial section taken on line 7—7 of Fig. 1.

The rear end of the boiler is formed of a substantially rectangular tubular ring 1, shown in elevation in Fig. 4, and there are extending between the bridge 2 and bottom 3 of said ring 1, a plurality of vertical tubes 4, which have steam-tight connection with the bridge and bottom of the ring. These tubes 4 are preferably placed close together and may touch if desired, or there may be left therebetween a space to allow for expansion and contraction of the tubes. These tubes 4 practically cover the rear end of the boiler, and they may be broken away in any approved manner to provide for a fire door 5, which may be hinged to flanges 6 cast integral with certain of the tubes 4. Of course, in the event of very large boiler construction an additional door may be added beside the one already shown at 5 to admit of the double working of the fire bed. The fore end of the boiler is provided with a ring 7 similar to the ring 1, and has extending between the top and bottom thereof a plurality of tubes 8, but it will be noted that these tubes 8 are spaced and are not close together, as in the case of the tubes 4 formed at the rear of the boiler, for the reason that it is desirable to have the smoke, gases and heat pass through said front end into a smoke box 9. These tubes 8, and also the tubes 4, are preferably made seamless and may be made of mild steel, wrought iron, or any other metals which are found to be satisfactory and which have sufficient elasticity to admit of their use as water tubes.

Figure 1:
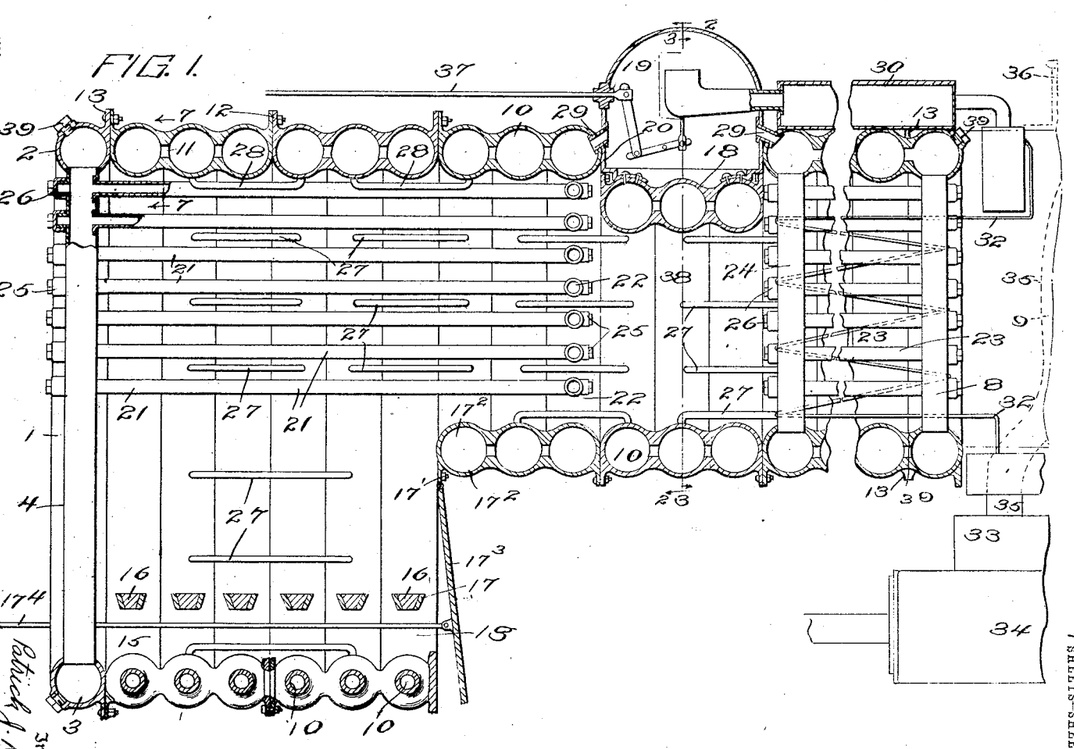
Figure 1 is a vertical longitudinal section through a boiler made in the manner of the present invention, showing certain boiler accessories.

Between the front and rear ends of the boiler there is provided a plurality of sets of tubes, each set of tubes comprising three tubes cast on one piece, and having their sides parallel so that when the various sets are assembled they will present such a surface as may be conveniently covered after the fashion at present in use in locomotive covers. These sets, indicated generally at 10, are inter-connected by means of a number of water holes 11, which pass through the metal, connecting adjacent tubes. The two ends of the sets of tubes are provided with flanges 12, so that the end 1, which is provided with a flange 13, may be connected to the end set and that the ring 7 which is provided with a flange 14 may be connected with the other end of the sets, and also that the individual sets of pipes may be connected. The means of connecting these sections form no particular part of the present invention, but they may be bolted or riveted. Whatever the construction, the same should be sufficiently strong to resist the strains to which locomotive boilers are constantly subjected. It will be seen that certain of these sets, the two shown in Fig. 1, are deeper than the remaining sets, the purpose of this construction being to provide a fire box 15, which is provided with a grate 16, supported from flanges 17 or other suitable means cast integral with the sets or sections 10. Hinged to flanges 17' formed on the tube 17² is a door 17³ which may be controlled by any suitable rod 17⁴ for regulating the draft in the fire box 15. If desired, of course, suitable grating may be provided against which the fire may be banked to prevent passage of the same through the opening of the door 17³ when the latter is thrown out. The remaining sections are made of less length than the rear end sections and provide a compartment in which additional tubes to be described hereinafter may be located. As shown at 18, certain of the sets are so formed as to lie somewhat beneath the top line of the sets, so as to provide a space for the usual steam dome 19. These reduced sets 18 may be secured to the adjacent sets by means of flanges 20 in a manner similar to the means used for connecting adjacent sections.

Figure 2:
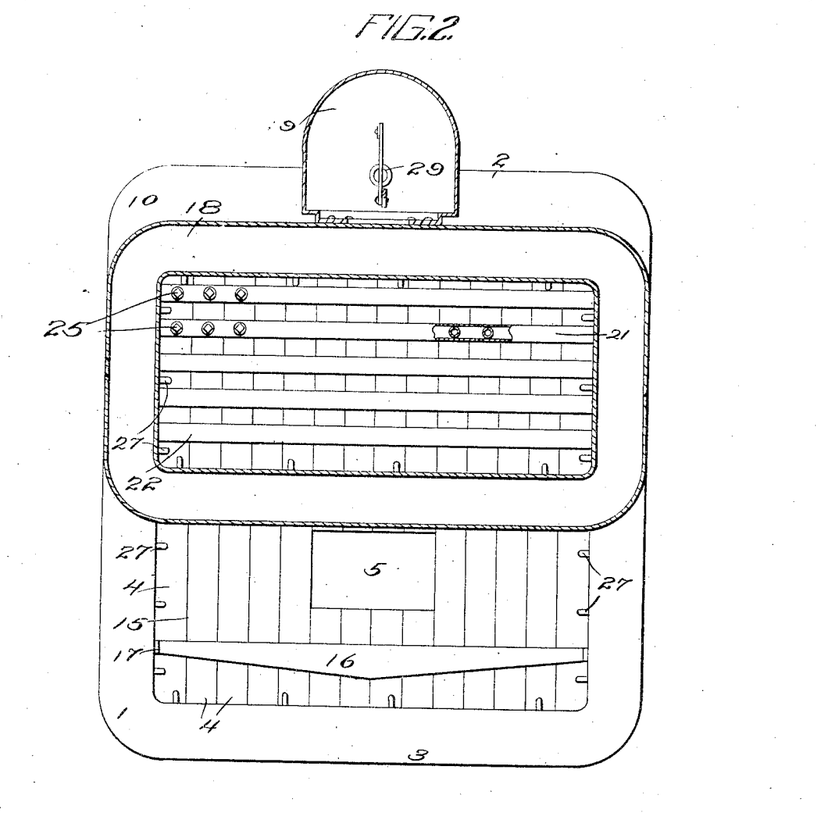
Fig. 2 is a vertical section taken on line 2—3 of Fig. 1, taken in the direction of the arrow 2.
Figure 3:
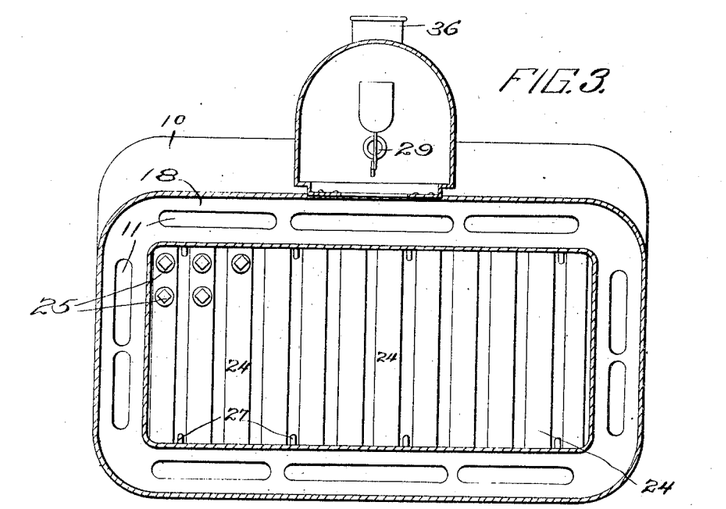
Fig. 3 is a section similar to Fig. 2, taken upon line 2—3 looking in the direction of arrow 3.

As shown in Figs. 1 and 2, there are extending inwardly from the tubes 4 formed at the rear of the boiler, numerous horizontal tubes 21, the outer ends of which are rolled in the rear of the boiler or are arranged in parallel layers, the inner ends of the tubes forming any one layer being connected by means of a horizontal tube 22 which may be somewhat larger than the tubes 21. These tubes have their ends formed in the rings of the sections 10, the particular construction shown in the drawings being to connect these tubes 22 to the section adjacent the reduced section 18. By means of these tubes 22 all of the tubes 21 are connected to the sections 10, while the said tubes are also connected to the ring 1 by means of the tubes 4.

Figure 8:
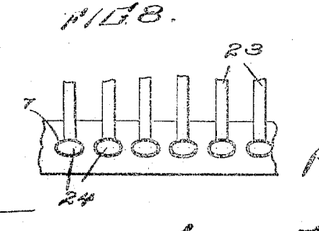
Fig. 8 is a section of the vertical tubes forming the front plate of the boiler, as seen in Fig. 5.

Each of the vertical tubes 8 formed in the fore part of the boiler has extending rearwardly therefrom a plurality of horizontal tubes 23 which lie substantially in vertical planes, and it will be seen by referring to Fig. 1 that a number of tiers of these tubes 23 is provided. The rear ends of these tubes 23 are secured in vertical connecting pipes 24 which pass from the bridge to the bottom of one of the sections 10, although of course, said pipes could just as easily pass between the corresponding parts of one of the sections 18. By means of the pipes 24 and tubes 8, the tubes 23 are connected to the side and end tubes forming the shell of the boiler. As before stated, the tubes 8 are spaced so as to admit of the passage of smoke and gases, and it will also be seen by referring to Fig. 8 that these tubes are flattened so as to have the requisite cross sectional area without unnecessarily obstructing the passage of the gases. The vertical tubes 4 and 8 at the rear and front of the locomotive respectively, and the vertical connecting pipes 24, and the horizontal tubes 22 are all provided with screw plugs 25 which fit in threaded openings 26 formed in the various tubes and pipes, said openings being somewhat larger than the diameter of the tubes, so that the latter may be inserted in place after the sections 10 and 18 have been assembled, and also admit of the frequent cleaning which is necessary in tubular boilers.

In order to provide inter-communication between adjacent sections 10 and 18, there is provided a plurality of coupling tubes 27, which are provided at numerous points throughout the interior of the boiler and connect tubes of adjacent sections or sets of tubes, so that the water of said adjacent sets may be in communication and all of the water throughout the boiler be in communication to provide for necessary circulation required to generate the steam. The under sides of the bridges of the sets or sections 10 are provided with additional couplings 28 similar to the couplings 27, these couplings 28 being provided to afford a steam connection between the bridges of all of the tubes forming the shell of the boiler. Any means may be provided for conveying the dry steam of the tubes to the steam dome 19, the method shown in the drawings, particularly Fig. 1, being to provide a plurality of steam pipes 29. Extending from the steam dome is a steam chest 30 which has formed on the outer end thereof a head 31 provided with perforations for receiving a number of small tubes 32 which start from the head 31 and bend back around the tubes 23, down and out of the front of the boiler, through the smoke box 9, into a steam chest 33 which is in communication with the cylinder 34 of the engine, said cylinder being shown diagrammatically. By means of these pipes 32, it will be seen that as the dry steam passes from the steam chamber 30, the same will be super-heated in the tubes so that super-heated steam may be used in the cylinder. As is common practice, a forced draft may be obtained by having a pipe 35 leading from the exhaust port of the cylinder located just beneath the stack 36, so that the jet may pass from the smoke box and in this way set up the draft. A throttle stem 37 is shown as entering the steam dome 19 and adapted to coöperate with the orifice of the steam chamber 30 in the usual manner, the said stem 37 passing rearwardly into a cab secured to the end of the boiler, but not shown in the drawing.

As gases arise from the grate 16 the same will pass upwardly and around the water tubes 21 and will then pass through the space 38 located between the vertical pipes 24 and the horizontal tubes 22, from whence they will pass around tubes 23, pass the tubes 8 into smoke box 9, and out of the stack 36. The gases which serve to heat the tubes 23 are also effective in heating the superheater tubes 32. The water heated in the several tubes will pass to the shell formed by the sections of tubing and will pass between such sections by means of the coupling tubes 27. By reason of the shell formed as described there will be a large portion of heated water surrounding the heating tubes which may be drawn upon to supply steam when any heavy demand is made upon the steam chamber. As in stationary boilers in common practice washout plugs 39 may be provided at various points on the end rings 1 and 7. It will be noticed that the water in the side tubes forming the shell may vary considerably before the water passes out of the tubes 21, and in ordinary running conditions the lower of the tubes 21 will be filled with water so that practically none of the flames from the fire bed will strike the empty tubes.

It is obvious that a boiler constructed after the form disclosed does not need a crown sheet, nor is there any need for stay bolts. Of course, the design of the fire box may be such as is required for any particular construction of locomotive and further the water tubes may be multiplied to give the proper heating surface for absorbing practically all of the heat which is given by the fire, and further the tubes will preferably be formed of such material as will resist the wearing of the cinders. The spacing of the tubes 8 may be regulated to retain within the boiler the gases until their usefulness has been exhausted. In order to give a finished appearance to the boiler, there may be placed around the various tubes a suitable lagging 40 and the rear end of the boiler may be covered and provided with the usual equipment.

Where used in localities in which the water is muddy or carries minerals likely to corrode and collect in pipes it will be necessary to construct the connecting tubes 27 considerably larger in proportion than as shown in the accompanying drawings, and they may be also connected in such manner that they can be removed readily when necessary.

Figure 9:
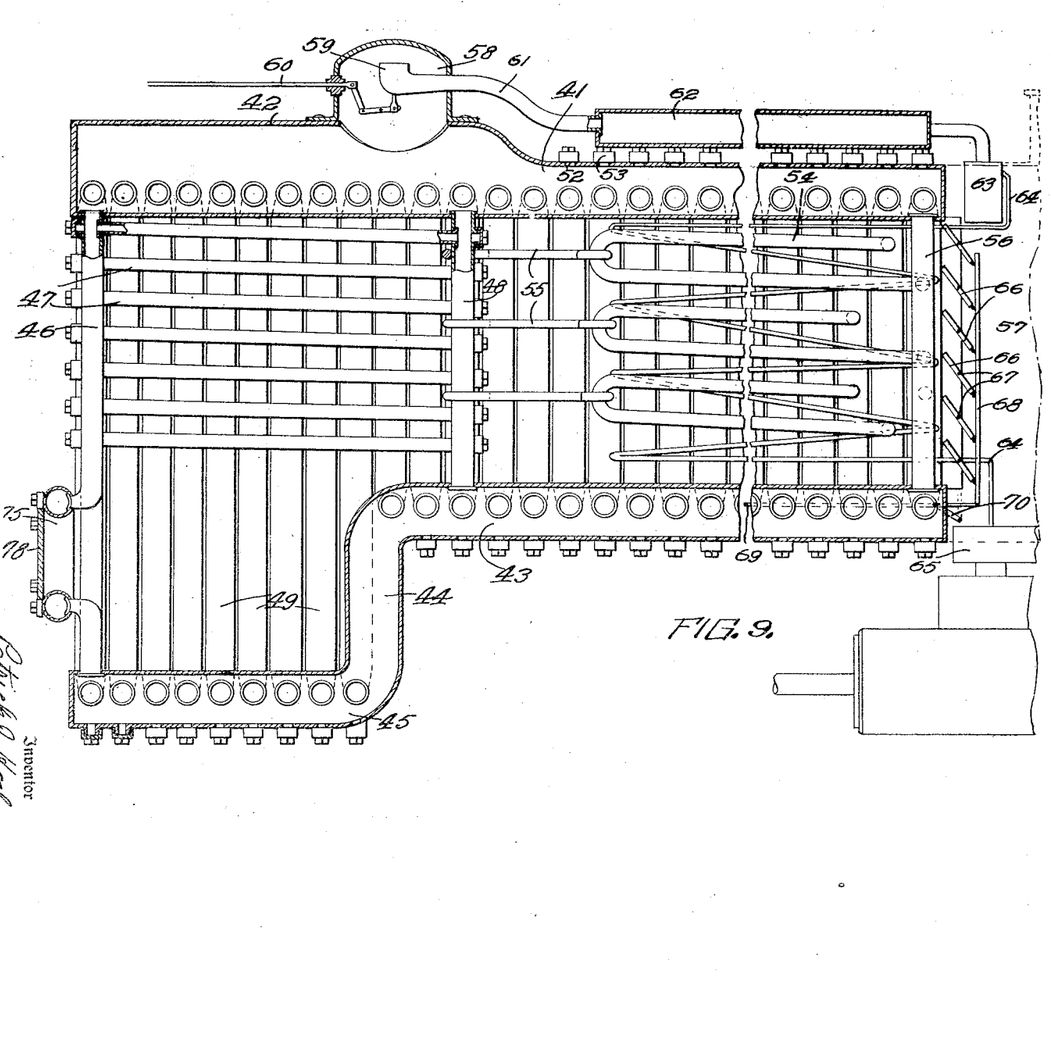
Fig. 9 is a vertical transverse section of a modified form of boiler.
Figure 10:
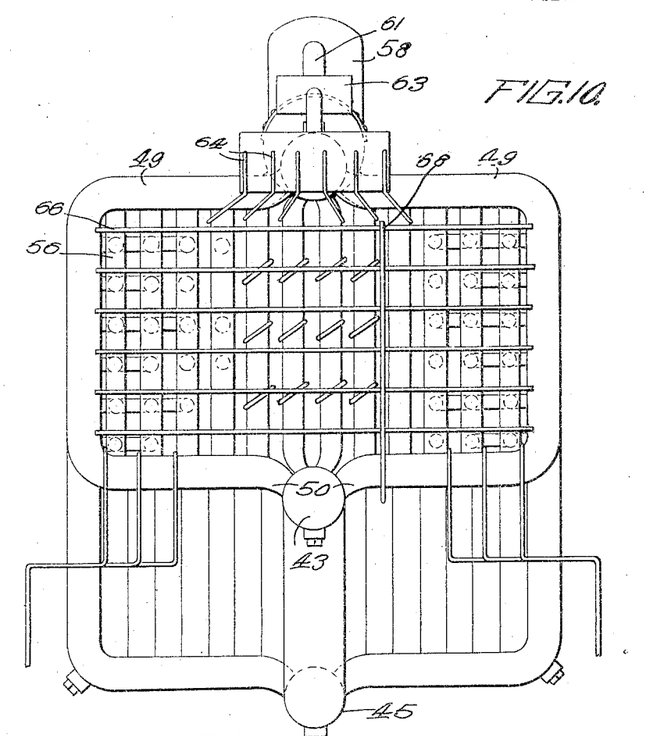
Fig. 10 is a front elevation of the boiler shown in Fig. 9.

The modified form of the invention shown in Figs. 9 to 12 inclusive, comprises a plurality of tubes having reduced ends which are received by barrels, one of said barrels being arranged along the top of the boiler while the other is carried by the bottom of the boiler. By this construction, circulation may be had and it is not necessary to use the auxiliary tubes shown at 27, in the preferred form of the invention. As shown in Fig. 9 the upper tube has two portions, the forward portion 41 being of less diameter than the rear portion 42, but the forward portion is made sufficiently large to act as a reservoir for receiving a considerable amount of steam. The lower tube is shown at 43, and may be made to conform to the general design of the boiler having a bent portion 44 which terminates in a horizontal end 45, the manner of making the tube as illustrated in the drawings, is to have the same continuous, but it is to be understood that both the barrels 43 and the upper tubes may be made in sections and joined in any approved manner. There is provided across the end of the boiler a plurality of tubes 46 which are sufficiently close to form substantially an air-tight connection to assist the draft within the boiler, while extending forwardly from said tubes 46, and preferably slanting slightly, are barrels 47, the forward ends of which are received by corresponding barrels 48, which pass vertically between the upper and lower barrels.

Figure 13:
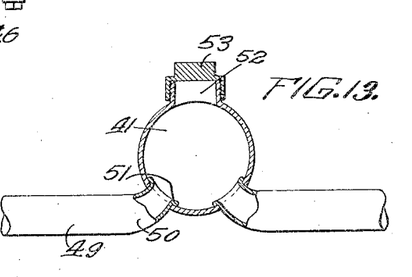
Fig. 13 is an enlarged fragmentary sectional view of the top tube and the connecting barrel, showing tubes rolled therein.

The body of the boiler is composed of a plurality of U-shaped tubes 49, the ends of which are bent slightly and reduced as at 50 to be received by the barrels of the boiler. The manner of connecting the tubes 49 to the barrels, is shown in Fig. 13 where the reduced ends 50 are rolled as at 51, into the barrels, access being had to the reduced ends through an opening 52 in the top of the barrel. There is one of these openings 52 above each pair of U-shaped tubes, and these openings are normally closed by plugs 53 which may be removed when it is desired to insert a new tube or to clean out the boiler or for any other reason to have access to the connection between the tubes 49 in the barrel. The enlarged barrel 42 may be sufficiently large to permit the tubes to be rolled into the barrel from the interior, in which case it will not be necessary to supply the plugs 53. The lower barrel has the lower ends connected thereto in a manner similar to the connections in the upper barrel so that both ends of the tube 49 are sealed within the barrels and each of the U-shaped tubes is in communication with all the other tubes forming the sides of the boiler. The forward set of substantially horizontal tubes comprises tubes 54 having parallel sides the ends of said tubes being connected to different side tubes so as to assist the circulation of the boiler. If desired, the loop ends of the tubes 54 may be secured by means of braces 55 to the vertical tubes 48 forming the forward end of the back set of substantially horizontal tubes, so that the outer ends of the forward tubes are loosely held to take up any jarring due to the running of the locomotive. Certain of the forward tubes 54 are secured within the foremost vertical tubes 56 which are spaced sufficiently to allow smoke to pass from the fire box to the smoke box, indicated in dotted lines at 57. The manner of operation and the precautions to be taken mentioned in connection with the preferred form are practically the same as in the modified form, so that as the water is heated steam will collect in the separate U-tubes and be led to the upper barrel, the enlarged portion of which is in direct contact with a dome 58 having a throttle 59 controlled by means of levers 60, the movement of which will lead steam through pipe 61 to steam chest 62, which is in connection with a distributer 63. Leading from the distributer 63, are numerous bent pipes 64 which are led in and around the tubes 54, and terminate ultimately in the steam chest 65 adjacent one of the cylinders of the engine. These tubes 64 form heating tubes similar to those shown in the preferred form of the invention.

In order that the draft may be regulated there is mounted a plurality of vanes 66 pivotally connected as at 67, to opposite sides of the boiler and in order that the vanes may be regulated, there is a rod 68 connected to each of the vanes which is also pivotally connected to a controller rod 69 pivotally mounted upon a rocker 70. It is obvious that as the controller arm 69 is moved forward and backward, the vanes will be opened and closed respectively, to increase or decrease the draft.

Figure 11:
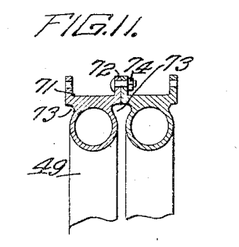
Fig. 11 is a fragmentary sectional view of the two adjacent tubes.

As shown in Fig. 11, each of the U-tubes 49 has extending therefrom, two flanges 71 and 72 which are connected to the outside of the tubes 49 in such a way as to form slots 73 for spacing adjacent tubes so that the gas from the combustion can surround the greater part of the tubes containing the water and thereby increase the heating surface. By means of these flanges 71 and 72 adjacent tubes may be connected together as by bolts or rivets 74, although I wish it to be understood that as in the preferred form, there may be cast together several tubes which may be connected in the manner similar to that shown in Figs. 1 to 8 of the drawings.

Figure 12:
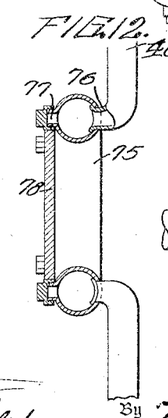
Fig. 12 is a view partly in section showing a door and the manner of rolling the tubes into the ring forming the door.

The manner of rolling the back tubes 46 into the ring 75, forming the door for the locomotive is shown in Fig. 12, where the reduced ends 76 of the tubes 46 are rolled through a normally closed opening 77 in a manner similar to that described in connection with the barrels and U-shaped tubes. Any suitable doors 78 may be pivoted to close the door normally as in the preferred form.

Any method for assembling the various tubes may employed when it is desired to build the locomotive after the manner of the present invention, and I prefer not to mention any particular method of assembly.

There could be arranged a connection of pipe on the front of the dome to connect the throttle with a number of small pipes to convey steam along the top of the boiler to steam chests. A number of super-heating pipes as shown may be provided to run between the front perpendicular water tubes of the boiler, preferably those perpendicular pipes near the center of the forward end of the boiler.

What I claim is:

1. A locomotive boiler, the shell of which is formed of sections of water tubing, means for inter-connecting said water tubings, means for locking the sections to each other, and means connecting the tubings to a common reservoir of steam.

2. A locomotive boiler, the shell of which is formed of sections, said sections comprising inter-connecting tubes, means for securing said sections together, means for inter-communication between the sections, and a common reservoir of steam in connection with the said sections.

3. A locomotive boiler, the shell of which is formed of water tubes, the water tubes of one end of said boiler being deeper than the remaining tubes, a fire-box formed in the deeper tubes, means for inter-connecting said tubes, and a common steam reservoir in communication with said tubes.

4. A locomotive boiler, the shell of which is formed of water tubes, the rear end of said boiler being substantially closed, the water tubes at the rear end being deeper than the remaining tubes to provide a fire-box, a draft regulator pivotally connected to the bottom of the boiler adjacent the forward end of the deeper water tubes and adapted to close the air connection between the fire box and the rest of the locomotive, means for inter-connecting the tubes, and a common steam reservoir in connection with said tubes.

5. A locomotive boiler, the shell of which is formed of water tubes, certain of said tubes being deeper than the remaining tubes, in order to form a fire box, the bottoms of said deeper tubes being contracted to leave spaces therebetween, means for inter-connecting the water tubes, and a common steam reservoir in connection with said tubes.

6. A locomotive boiler provided with a substantially closed rear end, the shell of which is formed of water tubes, certain of said tubes being deeper than the remaining tubes to form a fire box, the bottoms of said tubes being reduced to provide spaces between said tubes, means defining a draft regulator adapted to close air passage between the boiler and the atmosphere through the space between the deeper tubes and the remaining tubes, means for inter-connecting the tubes, and means for connecting said tubes to a common reservoir.

7. A locomotive boiler, the shell of which is formed of water tubes, the tops of certain of said water tubes being lower than the remaining tubes to define a space, a steam dome located within said space and connected to the water tubes, and means for inter-connecting the said tubes.

8. In a locomotive boiler, a plurality of ring shaped water tubes constructed to form the shell of the boiler, said water tubes passing between opposite sides of the rear ring shaped tube, auxiliary water tubes connected to said straight tubes, means for connecting adjacent ends of the auxiliary water tubes to the ring shaped water tubes, means for inter-connecting the ring shaped water tubes, and a common steam reservoir in communication with the ring shaped tubes.

9. A locomotive boiler, the shell of which is formed of a plurality of ring water tubes, vertical water tubes connecting opposite sides of the rearmost of said ring tubes and substantially filling the space between the sides of said ring tubes, auxiliary tubes connected to said vertical tubes, means for connecting said auxiliary tubes to certain of the ring water tubes, means for inter-connecting the ring water tubes, and a steam reservoir in communication with the latter tubes.

10. A locomotive boiler, the shell of which is formed of ring water tubes, the rearmost of said ring tubes being provided with a plurality of vertical water tubes, parallel layers of auxiliary water tubes connected to said vertical tubes, means for connecting the several layers to the ring water tubes, means for inter-connecting the said water tubes, and a steam reservoir in communication with the latter tubes.

11. A locomotive boiler, the shell of which is formed of a plurality of ring water tubes, one end of said boiler being substantially closed, the ring at the other end of said boiler having water tubes connecting the opposite sides thereof, auxiliary tubes extending from said spaced tubes, means for connecting the auxiliary tubes to the ring tubes, means for inter-connecting the tubes, and a steam reservoir in communication with the tubes.

12. A locomotive boiler, the shell of which is composed of a plurality of ring water tubes, means for inter-connecting said ring tubes, a reservoir of steam connected to said tubes, and a plurality of sinuous superheating steam tubes connected to said steam reservoir and located within the shell.

13. A locomotive boiler, the shell of which is formed of ring water tubes, straight water tubes extending perpendicular to the planes of said ringed tubes and located within the boiler and communicating with certain of the ring tubes, means of inter-communication between the ring water tubes, and a steam reservoir in communication with the latter tubes.

14. A steam boiler formed of a plurality of adjacent ring water tubes, other water tubes located within said ring water tubes and connecting therewith means for inter-connecting the ring tubes, and a steam reservoir in communication with the latter tubes.

15. A locomotive boiler, the shell of which is formed of a plurality of ring tubes, other tubes located within said ring tubes and connecting therewith means for inter-connecting the ring tubes, a steam reservoir in connection with the ring tubes, and superheated sinuous steam tubes leading from the steam reservoir between the tubes located between the ring tubes, and leading to a steam chest.

16. A boiler the shell of which is constructed of water tubes, a tubular member constituting a barrel connecting the upper portion of said water tubes and a second tubular member constituting a barrel connecting the lower portions of said tubes.

In testimony whereof I affix my signature in presence of two witnesses.

PATRICK J. HEALY.

Witnesses:
G. WARD KEMP,
WM. R. HOUGHTLING.